Feb. 24, 1925.
M. PEGER
1,527,215
COMBINED FOOT PROPELLED VEHICLE, COASTER, AND EXPRESS WAGON
Filed May 29, 1923   3 Sheets-Sheet 2
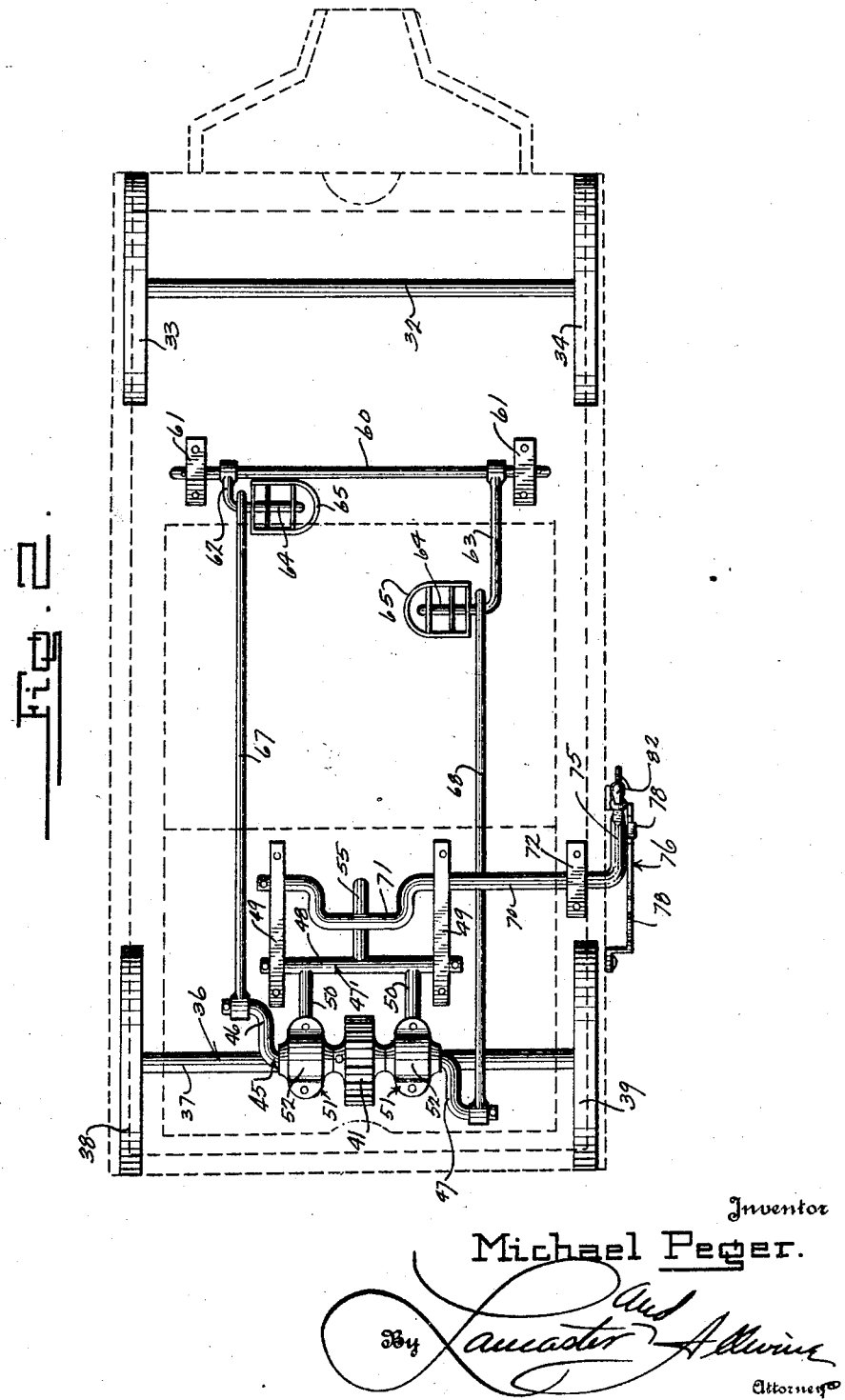
Inventor
Michael Peger.
By Lancaster Allwine
Attorneys

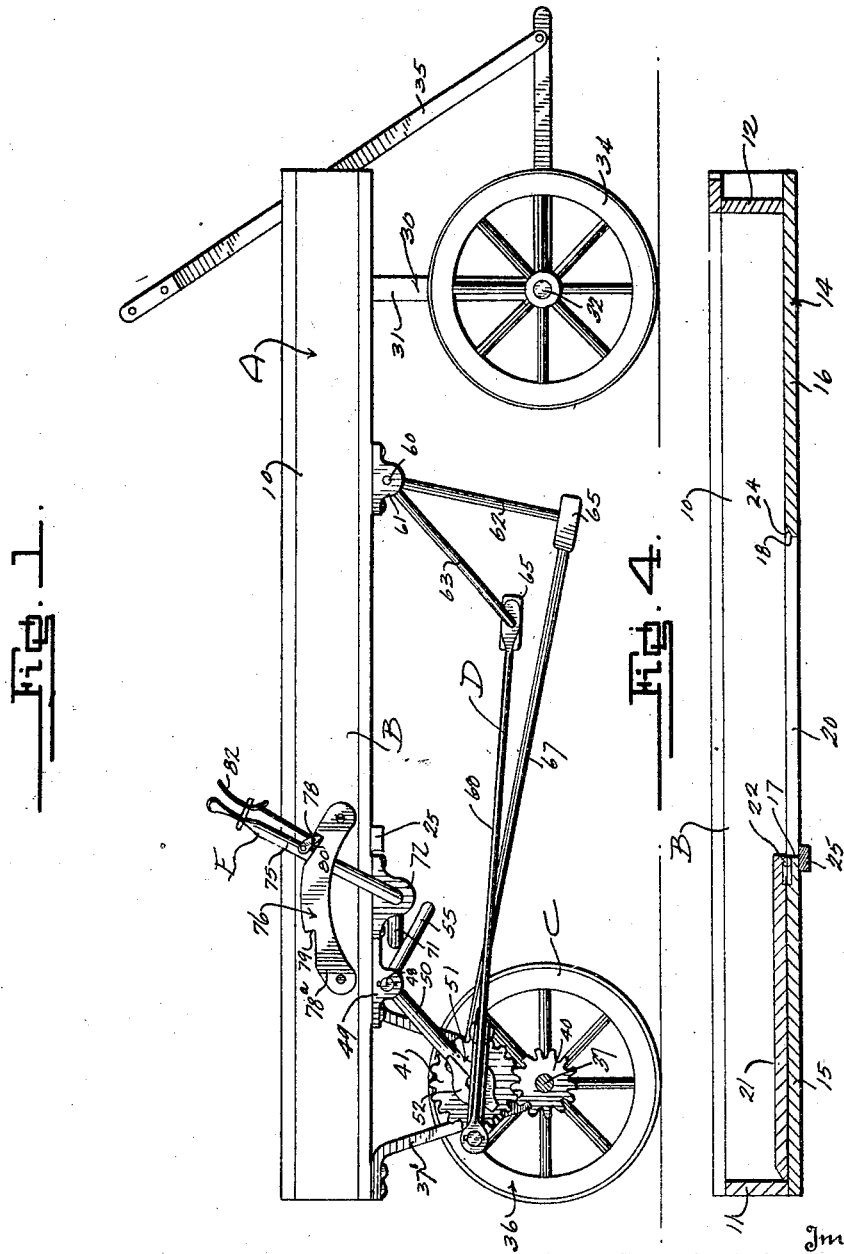

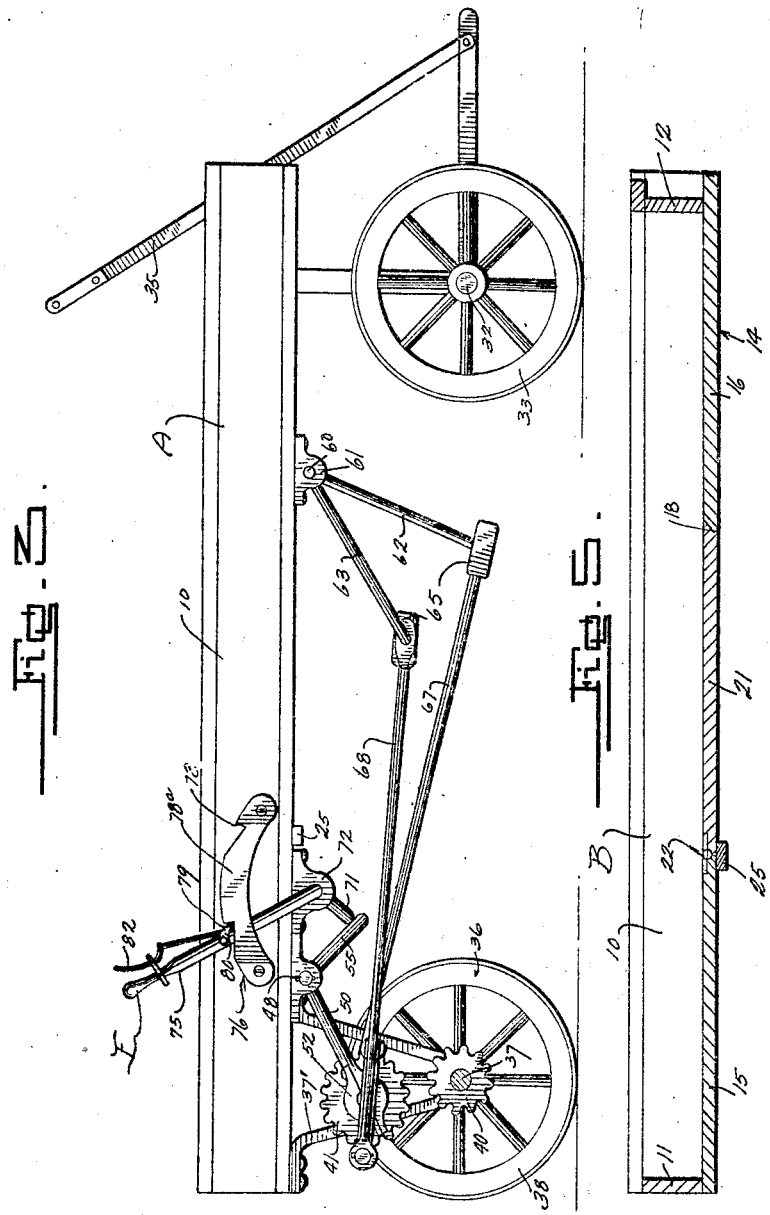

Patented Feb. 24, 1925.

1,527,215

UNITED STATES PATENT OFFICE.

MICHAEL PEGER, OF CLEVELAND, OHIO.

COMBINED FOOT-PROPELLED VEHICLE, COASTER, AND EXPRESS WAGON.

Application filed May 29, 1923. Serial No. 642,266.

*To all whom it may concern:*

Be it known that I, MICHAEL PEGER, a citizen of the United States, residing at Cleveland, in the county of Cuyahoga and State of Ohio, have invented certain new and useful Improvements in a Combined Foot-Propelled Vehicle, Coaster, and Express Wagon, of which the following is a specification.

This invention relates to improvements in children's vehicles.

The primary object of this invention is the provision of a vehicle of the express wagon type, which may be used as an ordinary coaster, or which may be used as a foot propelled vehicle.

A further object of this invention is the provision of a child's vehicle of the above mentioned character, which includes a relatively simple, compact and economic construction, whereby the same may be used as a coaster or as a foot propelled vehicle; the mechanism by means of which the vehicle may be foot propelled being of such nature as to be inoperative when the vehicle is used as a coaster.

Other objects and advantages of this invention will be apparent during the course of the following detailed description.

In the accompanying drawings, forming a part of this specification, and wherein similar reference characters designate corresponding parts throughout the several views.

Figure 1 is a side elevation of the improved combined foot propelled vehicle, coaster and express wagon, showing the details thereof in position whereby the same may be utilized as a foot propelled vehicle.

Figure 2 is a fragmentary plan view of certain novel cooperating details of the improved vehicle.

Figure 3 is a side elevation of the improved vehicle, showing the foot propelling mechanism thereof as in inoperative position so that the vehicle may be used much in the same manner as the ordinary coaster.

Figure 4 is a longitudinal cross sectional view, taken through the body or frame of the improved vehicle.

Figure 5 is a cross sectional view of the details illustrated in Figure 4, although showing different adjusted positions thereof.

In the drawings, wherein for the purpose of illustration is shown but the preferred embodiment of this invention, the letter A may generally designate a vehicle, which may include a frame B; running gear C; propelling means D; and means E for holding the propelling means D inoperative with respect to the running gear C when it is desired to use the vehicle as a coaster.

Referring first to the body B, the same may be a frame of any approved construction, although it is preferred that the same conform as nearly as possible to the ordinary express wagon body, such as is found in conventional types of express wagons for children's use. This frame B may include the longitudinally extending side rails 10; the end rail 11; and forward rail 12. The bottom 14 to which the side and end rails are attached is preferably of three part construction, including the rear portion 15 which extends from the rear end rail 11 for approximately one third the length of the body B; a forward portion 16 which extends from the front end rail 12 for approximately one third of the length of the body B. Between the facing margins 17 and 18 of the rear and front portions 15 and 16 respectively of the bottom 14, an opening 20 is provided through the bottom 14, over which a closure or lid 21 may cooperate, said lid 21 being hingedly connected, as at 22, adjacent the forward marginal portion of the bottom 15. The front edge 23 of the lid 21 may be bevelled, providing an inclined surface which may rest upon the edge bevelled surface 24 of the bottom portion 16, when the lid 21 is closed, whereby the same will be supported in stable relation in the same plane with the bottom portions 15 and 16. If desired, a supporting cleat 25 may be attached to the bottom surface of the bottom portion 15, so that the same extends slightly beyond the forward margin 17 thereof, which may aid in supporting the rear end of the lid 21 when the same is closed, and a weight imposed upon the lid.

Referring to the running gear C, the front portion 30 may be of the conventional construction, such as provided upon the type of vehicle herein described, which may con- sist of a supporting bracket 31 carried by the bottom 14 of the vehicle, and supported beneath the body B, the front axle 32, upon which the side wheels 33 and 34 are rotatably mounted. The front running gear 30 may be connected in any approved manner to the body C, to obtain a steering effect, and in connection therewith a tongue 35 of any approved construction may be provided, substantially as is illustrated in Figures 1 and 3 of the drawings.

The rear running gear 36 of the vehicle A preferably includes a rear axle 37 which is preferably supported below the body B, as by means of substantially V-shaped end brackets 37′, which are connected in any approved manner to the rear portion 15 of the bottom 14, for rotatably supporting the axle 37 therein. At its outer ends, the axle 37 has the rear wheels 38 and 39 fixed thereon for rotation with said rear axle.

Referring to the propelling means D, it is preferred that the same be of the foot propelled type, operated by means of a person sitting on the rear portion 15 of the bottom 14, whose legs extend through the opening 20 for operating said propelling means D.

A relatively small gear 40 is keyed to the rear axle 37, substantially midway of the wheels 38 and 39 thereon, with which a relatively larger gear 41 meshes during propelling of the vehicle A, as will be subsequently described. The relatively large gear 41 is carried by a swingable crank shaft 45, upon a straight intermediate portion thereof; the crank shaft 45 having the throws 46 and 47 upon the extreme ends thereof for cooperation with certain mechanism to be subsequently described. The crank shaft 45 is supported for swinging by a pivoted bracket device 47′, which includes a straight shaft portion 48 arranged upon a horizontal axis immediately below the rear portion 15 of the body 14, and supported in certain brackets 49 connected upon the lower surface of said body portion 15. From the shaft portion 48, bracket arms 50 extend outwardly substantially at right angles thereto, and have bearings 51 supported on the outer end of each, within which the intermediate straight portion of the crank shaft 45 is rotatably disposed. Each of the bearings 51 may include a portion rigid with the bracket arm 50, and an upper detachable cap portion 52. Rigid with the shaft portion 48 of the rocker bracket 47′, an arm 55 is provided, which extends outwardly from said shaft portion 48, at an obtuse angle with respect to the plane in which the bracket arms 50 lie, for cooperation with the release means E to be subsequently described.

The propelling means D preferably also includes a shaft 60 bearing in end brackets 61 upon the lower surface of the front portion 16 of the bottom 14, said shaft 60 being arranged transversely of the length of the body B, and adjacent the opening 20. Depending from the shaft 60 are a pair of pedal arms 62 and 63, having lower inturned ends 64 upon which are supported foot pedals 65 of any approved type. The crank throws 46 and 47 of the crank shaft 45, are respectively connected to the inturned ends 64 of the pedal arms 62 and 63, by means of relatively long connecting rods 67 and 68.

As the pedal arms 62 and 63 are arranged at an acute angle with respect to each other, and the throws of the crank shaft 45 are relatively offset, it is obvious that upon oscillatory movement of the pedal arms 62 and 63 upon their shaft 60, the crank shaft 45 may be rotated. The relatively large gear 41 rests, by gravity, upon the rear axle gear 40, so that the propelling mechanism will impart movement to the rear portion 36 of the running gear C, as is obvious.

Referring to the means E, by which the gears 40 and 41 may be held out of meshing relation, the same preferably includes a crank shaft portion 70, pivotally connected to the brackets 49 above mentioned, and intermediate which brackets 49 a throw 71 is provided, as a part of shaft 70, rearwardly extending for engagement with the cam arm 55 of the rocking bracket frame 47′. The crank shaft portion 70 furthermore extends outwardly toward a side of the frame D, and is supported adjacent a side rail by means of a bearing 72. This shaft portion 70 is upturned in a vertical plane adjacent the side rail 10 of the body B, providing an operating lever 75, by means of which the shaft portion 70 may be oscillatively moved. Means 76 for retaining the arm 75 in a determined position is provided, which includes a segment 78ª, attached at its ends to the side rail 10 of the body B, and providing depressions 78 and 79 inwardly thereof, within which a dog 80 pivoted to the arm 75 may cooperate. A lever portion 82 may be connected to the upper end of the arm 75 for moving the dog 80 out of either of the depressions 78 or 79, so that the crank arm portion 75 may be moved, as will be hereinafter described.

Referring to the operation of the improved vehicle A, to use the same as a foot propelled vehicle, the lid 21 of the bottom 14 is pulled back over the rear portion 15, substantially as is illustrated in Figure 4 of the drawings. The operator sits upon the exposed surface of the lid 21 with legs depending through the opening 20 for operation of the propelling means D, as can readily be understood. The ratio of the gears 41 and 40 is such as to impart relatively great speed of rotation to the wheels 38 and 39 of the running gear C.

If it is desired to use the vehicle as a coaster, the lid 21 is closed, substantially as is illustrated in Figure 5. The lever arm 75 of the means E is then drawn rearwardly so that the dog 80 thereof engages against the abrupt shoulder in the depression 79, substantially as is illustrated in Figure 3 of the drawings. This operation causes the throw 71 of the crank portion 70 to move downwardly for depressing the arm 55 of the bracket frame 47', causing upward pivotal movement of the bearing arms 50 of the bracket frame 47'. This, of course, elevates the crank shaft 45 and upwardly moves the large gear 41 out of meshing relation with the gear 40, substantially in the position illustrated in Figure 3 of the drawing. The vehicle can now be drawn or moved in manner similar to any coaster, and by reason of the disengagement of gears 40 and 41, the propelling mechanism D is retained inoperative.

From the foregoing description of this invention, it is apparent that a vehicle has been provided, which provides a relatively simple combination, the operating details of which are compactly arranged and so constructed that the same may be economically produced. The vehicle is one which will afford all of the conveniences of two vehicles in one, namely, a coaster, and foot propelled vehicle, without any complicated mechanism.

Various changes in the shape, size and arrangement of parts may be made to the form of invention herein shown and described, without departing from the spirit of the invention or the scope of the claims.

I claim:

1. A vehicle comprising a body, running gear for the body including a driven axle having a gear thereon, a bracket mounted for movement towards and away from the axle, operating means including an element movably carried by said bracket for engaging the gear and transmiting rotary movement to the axle through the medium of the gear, and means for moving the bracket away from the axle and retaining it in the adjusted position with the operating element carried thereby out of engagement with the gear.

2. A vehicle comprising a body, running gear for the body including a driven axle having a gear thereon, a supporting bracket pivoted to the body, a gear carried by the pivoted bracket adapted for meshing with the gear of said axle, and means for driving the gear of said pivoted bracket.

3. A vehicle comprising a body, running gear for the body including a driven axle having a gear thereon, a supporting bracket pivoted to the body, a gear carried by the pivoted bracket adapted for meshing with the gear of said axle, means for driving the gear of said pivoted bracket, and means for rocking said pivoted bracket whereby said gears may be held out of meshing relation.

4. A vehicle of the class described comprising a frame, running gear for said frame including a rotatable axle having wheels fixed thereon, a gear for said axle, a bracket arm oscillatively connected to the frame, a crank shaft supported at a free end of said pivoted bracket, a gear carried by said crank shaft adapted for meshing with the gear of said axle, foot pedals oscillatively connected to said frame, and connecting rods for said foot pedals and said crank shaft, whereby the gear of said pivoted bracket may be rotated for driving said running gear.

5. A vehicle of the class described comprising a frame, runing gear for said frame including a rotatable axle having wheels fixed thereon, a gear for said axle, a bracket arm oscillatively connected to the frame, a crank shaft supported at a free end of said pivoted bracket, a gear carried by said crank shaft adapted for meshing with the gear of said axle, foot pedals oscillatively connected to said frame, connecting rods for said foot pedals and said crank shaft whereby the gear of said pivoted bracket may be rotated for driving said running gear, and means for maintaining said pivoted bracket elevated so that the gear thereof is out of meshing relation with the axle gear.

6. A vehicle comprising a body, running gear for said body including an axle, a pivoted bracket on said body, intermeshing gear means for said pivoted bracket and axle, a crank shaft rotatably supported by said body, and an operating lever for rotating said crank shaft and moving the crank portion thereof into engagement with said pivoted bracket and moving the bracket whereby said gears may be held out of meshing relation.

7. A vehicle comprising a body including a bottom having front and rear fixed portions with an opening therebetween, and a closure hingedly connected to one of said portions for said opening, running gear affixed to the front and rear portions of the bottom, the rear portion of the running gear including a rotatable axle having wheels fixed thereon, a pivoted bracket member connected to said body, a crank shaft carried at a free end of said pivoted bracket, gears connected to said crank shaft and to the axle of said running gear, foot pedals, connecteing arms for said foot pedals and said crank shaft, and operating lever means adapted to cooperate against said pivoted bracket whereby the crank shaft of the same may be elevated for maintaining said gears out of meshing relation whereby the vehicle may be used as a coaster.

MICHAEL PEGER.